(12) United States Patent
Morisada

(10) Patent No.: US 8,843,176 B2
(45) Date of Patent: Sep. 23, 2014

(54) PRIVATE BRANCH EXCHANGE AND TELEPHONE SYSTEM

(75) Inventor: Katsuhiro Morisada, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 385 days.

(21) Appl. No.: 13/307,748

(22) Filed: Nov. 30, 2011

(65) Prior Publication Data

US 2012/0142325 A1 Jun. 7, 2012

(30) Foreign Application Priority Data

Dec. 1, 2010 (JP) ................................. 2010-268827

(51) Int. Cl.
| H04M 1/00 | (2006.01) |
| H04M 3/42 | (2006.01) |
| H04W 4/00 | (2009.01) |
| H04W 72/00 | (2009.01) |
| H04M 7/00 | (2006.01) |
| H04M 11/00 | (2006.01) |
| H04M 3/46 | (2006.01) |

(52) U.S. Cl.
CPC .......... H04M 3/42314 (2013.01); H04M 3/465 (2013.01)
USPC ..................... 455/554.2; 455/417; 455/452.1; 455/461; 455/462; 455/463; 455/554.1; 379/221.01; 379/207.13; 379/88.14

(58) Field of Classification Search
CPC ...................... H04M 2201/40; H04M 2201/60; H04M 3/53333; H04M 3/533; H04M 7/006; H04L 12/66; H04L 65/1069; H04L 65/1006; H04W 68/06; H04W 4/16; H04W 48/18; H04B 1/406
USPC ........... 455/417, 452, 552.1, 554.1, 461, 462, 455/463, 452.1, 554.2; 379/221.01, 207.13, 379/88.14, 21.01; 370/352, 465, 467
See application file for complete search history.

(56) References Cited

U.S. PATENT DOCUMENTS

| 6,611,689 | B1 * | 8/2003 | Cartigny et al. .............. 455/461 |
| 7,254,140 | B1 * | 8/2007 | Rokhsaz et al. .............. 370/465 |
| 2007/0297393 | A1 * | 12/2007 | Furukawa et al. ............ 370/352 |
| 2008/0212570 | A1 * | 9/2008 | Chen ............................. 370/352 |
| 2008/0285730 | A1 * | 11/2008 | Allaway et al. ............ 379/88.14 |
| 2009/0116634 | A1 * | 5/2009 | Levin et al. .............. 379/221.01 |
| 2011/0026701 | A1 * | 2/2011 | Kirchhoff et al. ........ 379/207.13 |

FOREIGN PATENT DOCUMENTS

| EP | 1 022 916 A1 | 7/2000 |
| JP | 5-95398 A | 4/1993 |
| JP | 10-4450 A | 1/1998 |
| JP | 2004-236031 A | 8/2004 |
| JP | 2004-320110 A | 11/2004 |
| JP | 2007-318232 A | 12/2007 |

OTHER PUBLICATIONS

The extended European Search Report dated May 7, 2012 (seven (7) pages).

* cited by examiner

Primary Examiner — Inder Mehra
(74) Attorney, Agent, or Firm — Crowell & Moring LLP (57) ABSTRACT

This private branch exchange includes a first communication portion acquiring connection target specifying information related to a connection target from a portable terminal, a second communication portion allowing telephone communication between a fixed telephone corresponding to the portable terminal and the connection target, and a control portion making a call to the connection target on the basis of the connection target specifying information and ringing the fixed telephone corresponding to the portable terminal from which the connection target specifying information has been acquired.

20 Claims, 5 Drawing Sheets

PORTABLE TELEPHONE-FIXED TELEPHONE TABLE

| No. | PORTABLE TELEPHONE (TELEPHONE NUMBER) | FIXED TELEPHONE (EXTENSION NUMBER) |
|---|---|---|
| 1 | aaa-aaaa-aaaa (PORTABLE TELEPHONE 2a) | AAA (FIXED TELEPHONE 3a) |
| 2 | bbb-bbbb-bbbb (PORTABLE TELEPHONE 2b) | BBB (FIXED TELEPHONE 3b) |
| 3 | ccc-cccc-cccc (PORTABLE TELEPHONE 2c) | CCC (FIXED TELEPHONE 3c) |
| 4 | ddd-dddd-dddd (PORTABLE TELEPHONE 2d) | DDD (FIXED TELEPHONE 3d) |

FIG.3

CONTROL FLOW IN PORTABLE TELEPHONE

FIG.4
CONTROL FLOW IN GATEWAY APPARATUS

PRIVATE BRANCH EXCHANGE AND
TELEPHONE SYSTEM

BACKGROUND OF THE INVENTION

1. Field of the Invention

The present invention relates to a private branch exchange and a telephone system, and more particularly, it relates to a private branch exchange and a telephone system each capable of acquiring connection target specifying information from a portable terminal.

2. Description of the Background Art

A telephone system capable of acquiring connection target specifying information from a portable terminal is known in general, as disclosed in Japanese Patent Laying-Open No. 2004-320110, for example.

The aforementioned Japanese Patent Laying-Open No. 2004-320110 discloses a system including a portable telephone capable of transmitting telephone numbers registered in a memory through infrared light, a push-button telephone (fixed telephone) automatically transmitting any telephone number received from the portable telephone, and a main apparatus transmitting the telephone number received from the push-button telephone to an outside line. The aforementioned Japanese Patent Laying-Open No. 2004-320110 describes no processing after the transmission of the telephone number to the outside line from the main apparatus.

If a plurality of push-button telephones are present in relation to the system described in the aforementioned Japanese Patent Laying-Open No. 2004-320110, however, it is conceivably impossible to inform the user about which one of the plurality of push-button telephones is connected with the connection target having the telephone number received from the portable telephone, since no processing after the transmission of the telephone number to the outside line from the main apparatus is described.

SUMMARY OF THE INVENTION

The present invention has been proposed in order to solve the aforementioned problem, and an object of the present invention is to provide a private branch exchange and a telephone system each capable of informing the user about a fixed telephone connected to a connection target.

A private branch exchange according to a first aspect of the present invention includes a first communication portion capable of acquiring connection target specifying information related to a connection target from a portable terminal, a second communication portion allowing telephone communication between a fixed telephone corresponding to the portable terminal and the connection target on the basis of the connection target specifying information, and a control portion making a call to the connection target on the basis of the connection target specifying information and ringing the fixed telephone corresponding to the portable terminal from which the connection target specifying information has been acquired.

As hereinabove described, the private branch exchange according to the first aspect of the present invention is provided with the first communication portion capable of acquiring the connection target specifying information related to the connection target from the portable terminal and the control portion making a call to the connection target on the basis of the connection target specifying information and ringing the fixed telephone corresponding to the portable terminal from which the connection target specifying information has been acquired, whereby the private branch exchange can inform the user about the fixed telephone connected to the connection target on the basis of the connection target specifying information by ringing the fixed telephone corresponding to the portable terminal from which the connection target specifying information has been acquired.

The aforementioned private branch exchange according to the first aspect preferably further includes a storage portion storing association between each of a plurality of portable terminals and the fixed telephone corresponding to each of the plurality of portable terminals, and the control portion is preferably formed to ring the fixed telephone corresponding to the portable terminal from which the connection target specifying information has been acquired on the basis of the association between the portable terminal and the fixed telephone stored in the storage portion. According to this structure, the control portion can reliably recognize the fixed telephone corresponding to the portable terminal from which the connection target specifying information has been acquired on the basis of the association previously stored in the storage portion, whereby the same can more reliably ring the fixed telephone corresponding to the portable terminal from which the connection target specifying information has been acquired.

In this case, the first communication portion is preferably formed to also acquire telephone number information of the portable terminal from the portable terminal, in addition to the connection target specifying information related to the connection target. According to this structure, the control portion can easily specify the fixed telephone corresponding to the portable terminal on the basis of the telephone number information acquired from the portable terminal.

In the aforementioned private branch exchange including the storage portion, the storage portion preferably stores one-to-one correspondence between the portable terminal and the fixed telephone in a list form. According to this structure, the control portion can more easily specify the fixed telephone corresponding to the portable terminal from which the connection target specifying information has been acquired on the basis of the one-to-one correspondence between the portable terminal and the fixed telephone stored in the list form.

In this case, the storage portion preferably stores one-to-one correspondence between a telephone number assigned to the portable terminal and an extension number assigned to the fixed telephone in a list form. According to this structure, the control portion can easily specify the extension number of the fixed telephone corresponding to the portable terminal from which the connection target specifying information has been acquired on the basis of the one-to-one correspondence between the telephone number of the portable terminal and the extension number of the fixed telephone stored in the list form.

In the aforementioned private branch exchange according to the first aspect, the control portion is preferably formed to allow telephone communication between the fixed telephone and the connection target by connecting the fixed telephone and the connection target with each other through the second communication portion when the user makes telephone communication through the fixed telephone in response to ringing of the fixed telephone. According to this structure, the control portion connects the fixed telephone and the connection target with each other through the second communication portion when the user makes telephone communication through the fixed telephone in response to ringing of the fixed telephone, thereby easily allowing the telephone communication between the fixed telephone and the connection target.

In the aforementioned private branch exchange according to the first aspect, the second communication portion is preferably formed to be connectable to the portable terminal and the connection target, and the control portion is preferably formed to allow telephone communication between the portable terminal and the connection target by connecting the portable terminal corresponding to the fixed telephone and the connection target with each other through the second communication portion when the user does not make telephone communication through the fixed telephone in response to ringing of the fixed telephone. According to this structure, the control portion can more reliably allow the user having transmitted the connection target specifying information from the portable terminal to make telephone communication with the connection target by connecting the portable terminal from which the connection target specifying information has been acquired and the connection target with each other through the second communication portion, also when the user does not make telephone communication through the fixed telephone in response to ringing of the fixed telephone.

In this case, the control portion is preferably formed to allow telephone communication between the portable terminal and the connection target by connecting the portable terminal corresponding to the fixed telephone and the connection target with each other through the second communication portion in place of telephone communication between the fixed telephone and the connection target on the assumption that the user does not make telephone communication through the fixed telephone in response to ringing of the fixed telephone when determining that the line of the fixed telephone is busy. According to this structure, the control portion connects the portable terminal corresponding to the fixed telephone and the connection target with each other through the second communication portion also when the line of the fixed telephone is busy, whereby the user can reliably make telephone communication with the connection target.

In the aforementioned private branch exchange having the control portion allowing telephone communication between the portable terminal and the connection target when the user does not make telephone communication through the fixed telephone, the control portion is preferably formed to allow telephone communication between the portable terminal and the connection target by connecting the portable terminal corresponding to the fixed telephone and the connection target with each other through the second communication portion in place of telephone communication between the fixed telephone and the connection target on the assumption that the user does not make telephone communication through the fixed telephone in response to ringing of the fixed telephone when determining that the user has not performed a telephone communication starting operation on the fixed telephone up to a lapse of a prescribed time from starting of ringing of the fixed telephone. According to this structure, the control portion connects the portable terminal corresponding to the fixed telephone and the connection target with each other through the second communication portion also when the user has not performed the telephone communication starting operation on the fixed telephone up to a lapse of the prescribed time from starting of ringing of the fixed telephone, whereby the user can reliably make telephone communication with the connection target.

In the aforementioned private branch exchange having the control portion allowing telephone communication between the portable terminal and the connection target when the user does not make telephone communication through the fixed telephone, the control portion is preferably formed to transmit information requesting the connection target to be on standby to the connection target through the second communication portion before connecting the portable terminal corresponding to the fixed telephone and the connection target with each other through the second communication portion. According to this structure, the control portion can previously inform the connection target about the request to be on standby before a lapse of a time (waiting time) required for connecting the connection target and the portable terminal with each other through the second communication portion, whereby the connection target can be inhibited from erroneously recognizing that the same has been disconnected from the private branch exchange in the waiting time.

In the aforementioned private branch exchange according to the first aspect, the control portion is preferably formed to transmit information purporting that connection with the connection target is not established to the portable terminal through the first communication portion without ringing the fixed telephone when connection with the connection target is not established. According to this structure, the user can easily recognize that connection with the connection target is not established.

In the aforementioned private branch exchange according to the first aspect, the first communication portion is preferably formed to acquire the connection target specifying information related to the connection target from the portable terminal by making infrared communication. According to this structure, the first communication portion capable of making infrared communication can easily acquire the connection target specifying information from the portable telephone.

In the aforementioned private branch exchange according to the first aspect, the second communication portion preferably includes a telephone communication portion connected to an outside telephone network and an IP communication portion connected to an IP network, and is preferably formed to allow telephone communication between the fixed telephone and the connection target through at least either the outside telephone network or the IP network. According to this structure, the second communication portion can easily allow telephone communication between the fixed telephone and the connection target through at least either the outside telephone network or the IP network, due to the presence of the telephone communication portion and the IP communication portion.

In this case, the control portion is preferably formed to make a call by selecting either the outside telephone network or the IP network not occupied for another call. According to this structure, the control portion can easily allow telephone communication through the outside telephone network or the IP network not occupied for another call.

In the aforementioned private branch exchange having the second communication portion including the telephone communication portion and the IP communication portion, the control portion is preferably formed to make a call by selecting either the outside telephone network or the IP network at a lower charge. According to this structure, the user can make telephone communication at a low cost through the outside telephone network or the IP network at a lower charge.

A telephone system according to a second aspect of the present invention includes a portable terminal capable of transmitting connection target specifying information related to a connection target, a plurality of fixed telephones, and a private branch exchange including a first communication portion capable of acquiring the connection target specifying information transmitted from the portable terminal, a second communication portion allowing telephone communication between the fixed telephone corresponding to the portable terminal and the connection target on the basis of the connection target specifying information, and a control portion formed to make a call to the connection target on the basis of the connection target specifying information and to ring the fixed telephone corresponding to the portable terminal from which the connection target specifying information has been acquired.

In the telephone system according to the second aspect of the present invention, as hereinabove described, the private branch exchange is provided with the first communication portion capable of acquiring the connection target specifying information related to the connection target from the portable terminal and the control portion making a call to the connection target on the basis of the connection target specifying information and ringing the fixed telephone corresponding to the portable terminal from which the connection target specifying information has been acquired, whereby the telephone communication system can inform the user about the fixed telephone connected to the connection target on the basis of the connection target specifying information by ringing the fixed telephone corresponding to the portable terminal from which the connection target specifying information has been acquired.

In the aforementioned telephone system according to the second aspect, the private branch exchange preferably further includes a storage portion storing association between each of a plurality of portable terminals and the fixed telephone corresponding to each of the plurality of portable terminals, and the control portion of the private branch exchange is preferably formed to ring the fixed telephone corresponding to the portable terminal from which the connection target specifying information has been acquired on the basis of the association between the portable terminal and the fixed telephone stored in the storage portion. According to this structure, the control portion can reliably recognize the fixed telephone corresponding to the portable terminal from which the connection target specifying information has been acquired on the basis of the association previously stored in the storage portion, whereby the same can more reliably ring the fixed telephone corresponding to the portable terminal from which the connection target specifying information has been acquired.

In this case, the first communication portion of the private branch exchange is preferably formed to also acquire telephone number information of the portable terminal from the portable terminal, in addition to the connection target specifying information related to the connection target. According to this structure, the control portion can easily specify the fixed telephone corresponding to the portable terminal on the basis of the telephone number information acquired from the portable terminal.

In the aforementioned telephone system having the private branch exchange including the storage portion, the storage portion of the private branch exchange preferably stores one-to-one correspondence between the portable terminal and the fixed telephone in a list form. According to this structure, the control portion can more easily specify the fixed telephone corresponding to the portable terminal from which the connection target specifying information has been acquired on the basis of the one-to-one correspondence between the portable terminal and the fixed telephone stored in the list form.

In this case, the storage portion of the private branch exchange preferably stores one-to-one correspondence between a telephone number assigned to the portable terminal and an extension number assigned to the fixed telephone in a list form. According to this structure, the control portion can easily specify the extension number of the fixed telephone corresponding to the portable terminal from which the connection target specifying information has been acquired on the basis of the one-to-one correspondence between the telephone number of the portable terminal and the extension number of the fixed telephone stored in the list form.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a telephone system 100 according to the embodiment of the present invention is described with reference to FIGS. 1 and 2.

Figure 1:
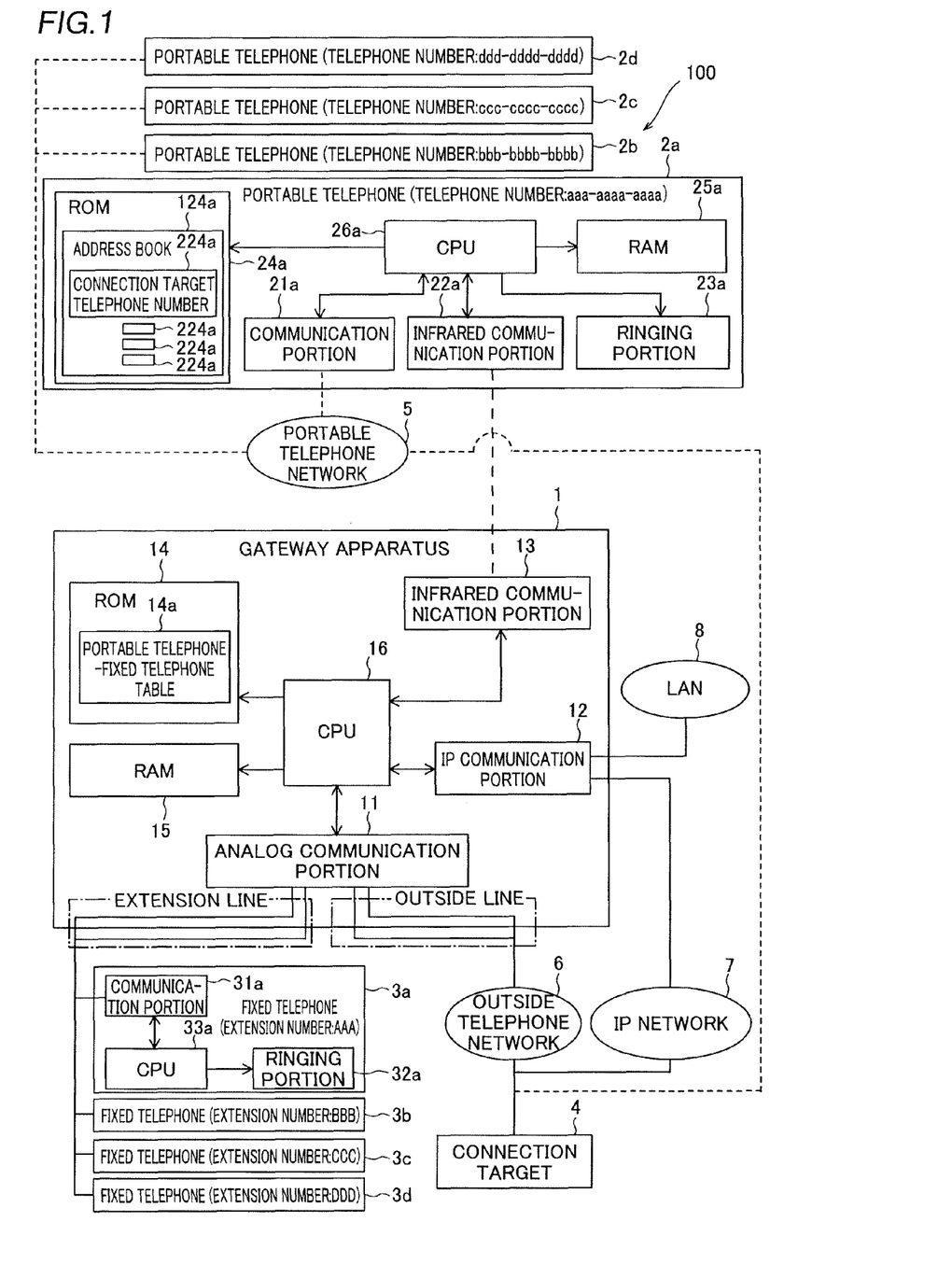
FIG. 1 is a block diagram showing the overall structure of a telephone system according to an embodiment of the present invention.

The telephone system 100 according to the embodiment of the present invention includes a gateway apparatus 1, four portable telephones 2a, 2b, 2c and 2d and four fixed telephones 3a, 3b, 3c and 3d, as shown in FIG. 1. The gateway apparatus 1 has a function of relaying either an external connection target 4 or any of the portable telephones 2a to 2d to any of the four fixed telephones 3a to 3d. The gateway apparatus 1 is an example of the "private branch exchange" in the present invention, and the portable telephones 2a, 2b, 2c and 2d are examples of the "portable terminal" in the present invention.

Specific telephone numbers are assigned to the portable telephones 2a, 2b, 2c and 2d respectively. Further, specific extension numbers are assigned to the fixed telephones 3a, 3b, 3c and 3d respectively.

The portable telephone 2a includes a communication portion 21a used for making telephone communication or the like through the portable telephone 2a, an infrared communication portion 22a used for making data communication other than the telephone communication, a ringing portion 23a, a ROM 24a, a RAM 25a and a CPU 26a, as shown in FIG. 1.

The communication portion 2a is connectable to a portable telephone network 5, and formed to thereby allow single-line telephone communication. Consequently, the portable telephone 2a is formed to be capable of making telephone communication with the gateway apparatus 1 connected to an outside telephone network 6 and an IP network 7 through the portable telephone network 5. The infrared communication portion 22a is formed to be capable of making radio communication with an infrared communication portion 13, described later, of the gateway apparatus 1. The ringing portion 23a is formed to generate a ringtone or to vibrate (ring) on the basis of a control operation of the CPU 26a when the communication portion 21a receives an incoming call. Thus, the CPU 26a is formed to inform the user operating the portable telephone 2a about the incoming call.

The ROM 24a, formed by a rewritable nonvolatile memory, stores a program for controlling the portable telephone 2a etc. The ROM 24a also stores an address book 124a storing a plurality of connection target telephone numbers 224a corresponding to a plurality of connection targets 4 respectively. The CPU 26a is formed, when the user selects any of the plurality of connection target telephone numbers 224a from the address book 124a by operating the portable telephone 2a, to transmit the selected connection target telephone number 224a and a telephone number (telephone number information) "aaa-aaaa-aaaa" of the portable telephone 2a to the gateway apparatus 1 through the infrared communication portion 22a. The connection target telephone numbers 224a are examples of the "connection target specifying information" in the present invention.

The RAM 25a, formed by a volatile memory, is used as a working area of the CPU 26a. The CPU 26a is formed to control operations of the respective portions of the portable telephone 2a by running the program stored in the ROM 24a.

The portable telephones 2b, 2c and 2d are similar in structure to the portable telephone 2a, and hence redundant description is omitted.

The fixed telephone 3a includes a communication portion 31a for performing analog line connection, a ringing portion 32a and a CPU 33a, as shown in FIG. 1. The communication portion 31a is connected to an analog communication portion 11, described later, of the gateway apparatus 1, and formed to be capable of making telephone communication with the gateway apparatus 1 through an extension line. The ringing portion 32a is formed to generate a ringtone (to ring) on the basis of a control operation of the CPU 33a when the communication portion 31a receives an incoming call. Thus, the CPU 33a is formed to inform the user that the fixed telephone 3a has received the incoming call. Further, the CPU 33a is formed to control operations of the respective portions of the fixed telephone 3a by running an unshown program.

The fixed telephones 3b, 3c and 3d are similar in structure to the fixed telephone 3a, and hence redundant description is omitted.

The gateway apparatus 1 includes the analog communication portion 11 for performing analog line connection, an IP communication portion 12 for performing line connection to an IP (Internet Protocol) network 7 and the infrared communication portion 13, as shown in FIG. 1. The gateway apparatus 1 further includes a ROM 14, a RAM 15 and a CPU 16.

The analog communication portion 11 is connected to the outside telephone network 6 through a plurality of outside lines, and formed to be capable of simultaneously performing a plurality of telephone communication operations through the respective outside lines. Thus, the gateway apparatus 1 is formed to be capable of connecting the connection target 4 and the portable telephone 2a (2b, 2c or 2d) with each other through the analog communication portion 11 or the IP communication portion 12 by connecting the gateway apparatus 1 and the connection target 4 with each other through the analog communication portion 11 or the IP communication portion 12 and simultaneously connecting the gateway apparatus 1 and the portable telephone 2a (2b, 2c or 2d) with each other through the analog communication portion 11 or the IP communication portion 12. The analog communication portion 11 and the IP communication portion 12 are examples of the "second communication portion" in the present invention. The analog communication portion 11 is also an example of the "telephone communication portion" in the present invention.

The analog communication portion 11 is connected to the four fixed telephones 3a to 3d through a plurality of extension lines, and formed to allow telephone communication between the fixed telephones 3a to 3d and the connection target 4 or the portable telephones 2a to 2d by connecting the outside lines or the IP communication portion 12 and the extension lines with each other. A LAN (Local Area Network) 8 is connected to IP communication portion 12, which has a function of communicatively connecting terminals (not shown) on the LAN 8 with each other.

The infrared communication portion 13 is formed to be capable of making radio communication with the portable telephone 2a (2b, 2c or 2d) and to be capable of receiving any connection target telephone number 224a selected by the user on the portable telephone 2a (2b, 2c or 2d) and the telephone number of the portable telephone 2a (2b, 2c or 2d). The infrared communication portion 13 is an example of the "first communication portion" in the present invention.

Figure 2:
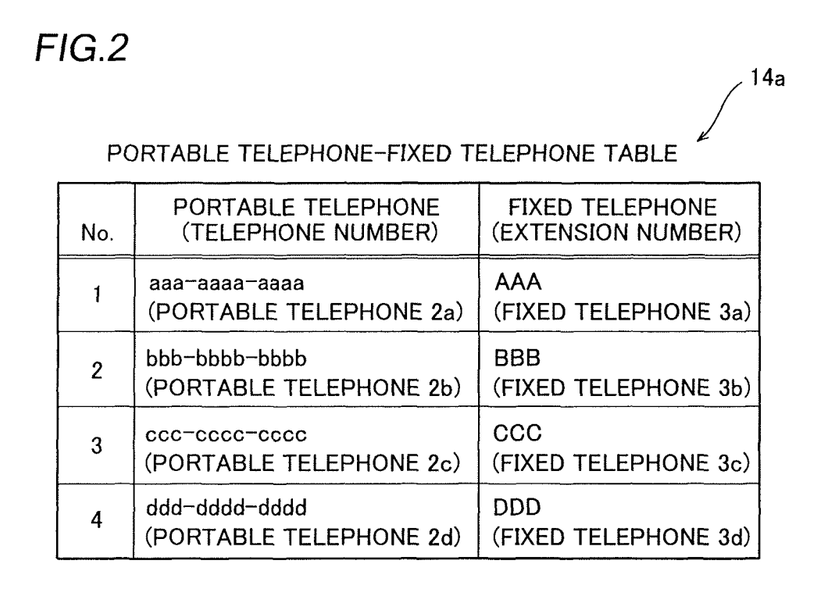
FIG. 2 illustrates a portable telephone-fixed telephone table according to the embodiment of the present invention.

The ROM 14 stores a portable telephone-fixed telephone table 16a shown in FIG. 2, in addition to a program for controlling the gateway apparatus 1 and various set information of the gateway apparatus 1. The portable telephone-fixed telephone table 16a stores one-to-one correspondence between each of the telephone numbers of the portable telephones 2a, 2b, 2c and 2d and each of the extension numbers of the fixed telephones 3a, 3b, 3c and 3d corresponding to the portable telephones 2a, 2b, 2c and 2d respectively in a list form. The ROM 14 is an example of the "storage portion" in the present invention.

More specifically, the portable telephone 2a having the telephone number "aaa-aaaa-aaaa" is associated with the fixed telephone 3a having an extension number "AAA". The portable telephone 2b having a telephone number "bbb-bbbb-bbbb" is associated with the fixed telephone 3b having an extension number "BBB". The portable telephone 2c having a telephone number "ccc-cccc-cccc" is associated with the fixed telephone 3c having an extension number "CCC". The portable telephone 2d having a telephone number "ddd-dddd-dddd" is associated with the fixed telephone 3d having an extension number "DDD".

As shown in FIG. 1, the RAM 15, formed by a volatile memory, is used as a working area of the CPU 16. The CPU 16 is formed to control operations of the respective portions of the gateway apparatus 1 by running the program stored in the ROM 14. The CPU 16 is an example of the "control portion" in the present invention.

According to this embodiment, the CPU 16 is formed to attempt connection to the connection target 4 specified by the corresponding connection target telephone number 224a by transmitting the connection target telephone number 224a received from the portable telephone 2a to an external telephone switchboard (not shown) or the like through the analog communication portion 11 or the IP communication portion 12. Further, the CPU 16 is formed to select either the outside telephone network 6 or the IP network 7 not yet occupied by another call or the like and at a lower charge and to transmit the connection target telephone number 224a to the external telephone switchboard or the like through the analog communication portion 11 or the IP communication portion 12 corresponding to the selected network 6 or 7 at this time.

In addition, the CPU 16 is formed to extract the fixed telephone 3a corresponding to the portable telephone 2a with reference to the portable telephone-fixed telephone table 16*a* stored in the ROM 14 and to make a call to the extension number "AAA" of the extracted fixed telephone 3*a* while maintaining connection with the connection target 4 when the connection with the connection target 4 is established. Thus, the CPU 16 is formed to ring the ringing portion 32*a* of the fixed telephone 3*a* unless the line of the fixed telephone 3*a* is busy. Further, the CPU 16 is formed, when detecting that the user of the fixed telephone 3*a* has performed a telephone communication starting operation such as that of picking up a telephone receiver (not shown) within a prescribed time and the line has been connected (off-hook), to connect the fixed telephone 3*a* and the connection target 4 to the external telephone switchboard for allowing telephone communication between the fixed telephone 3*a* and the connection target 4.

According to this embodiment, the CPU 16 is formed, when the line of the fixed telephone 3*a* is busy or the fixed telephone 3*a* is not off-hook but the ringing portion 32*a* is rung in excess of the prescribed time (connection with the fixed telephone 3*a* cannot be established), to transmit information (standby information) requesting the connection target 4 to be on standby with a message "connecting, please wait" to the connection target 4, with which the connection has been established, through the analog communication portion 11 or the IP communication portion 12. Thus, the CPU 16 is formed to output the information requesting the connection target 4 to be on standby with a voice or an image.

Further, the CPU 16 is formed to attempt connection to the portable telephone 2*a* by transmitting the telephone number "aaa-aaaa-aaaa" of the portable telephone 2*a* to an external portable telephone base station (not shown) or the like through the analog communication portion 11 or the IP communication portion 12 after transmitting the standby information. Thus, the CPU 16 is formed to ring the ringing portion 23*a* of the portable telephone 2*a* having transmitted the connection target telephone number 224*a*. Further, the CPU 16 is formed, when detecting that the user of the portable telephone 2*a* has performed a telephone communication starting operation by pressing an unshown prescribed button or the like and the line has been connected (off-hook), to allow telephone communication between the portable telephone 2*a* and the connection target 4 by connecting the portable telephone 2*a* and the connection target 4 with each other through the analog communication portion 11 or the IP communication portion 12.

The CPU 16 is formed, when the line of the connection target 4 is busy (connection with the connection target 4 cannot be established), to transmit information (busy information) to the portable telephone 2*a* with a message "the line is busy" through the infrared communication portion 13. Thus, the CPU 16 is formed to output the busy information to the portable telephone 2*a* with a voice or an image. Further, the CPU 16 is formed to recognize that the line of the connection target 4 is busy by detecting a busy tone transmitted from the external telephone switchboard (not shown). In addition, the CPU 16 is formed, when transmitting the busy information to the portable telephone 2*a*, not to make a call to the fixed telephone 3*a* corresponding to the portable telephone 2*a*. In other words, the CPU 16 is formed not to ring the ringing portion 32*a* of the fixed telephone 3*a* when transmitting the busy information to the portable telephone 2*a*.

The CPU 16 of the gateway apparatus 1 is formed to also control the portable telephones 2*b*, 2*c* and 2*d* similarly to the portable telephone 2*a*. Further, the CPU 16 is formed to also control the fixed telephones 3*b*, 3*c* and 3*d* similarly to the fixed telephone 3*a*.

Operations of the CPUs 26*a*, 16 and 33*a* of the portable telephone 2*a*, the gateway apparatus 1 and the fixed telephone 3*a* in relation to connection with the connection target 4 in the telephone system 100 according to the embodiment of the present invention are now described with reference to FIGS. 1 to 5.

Figure 3:
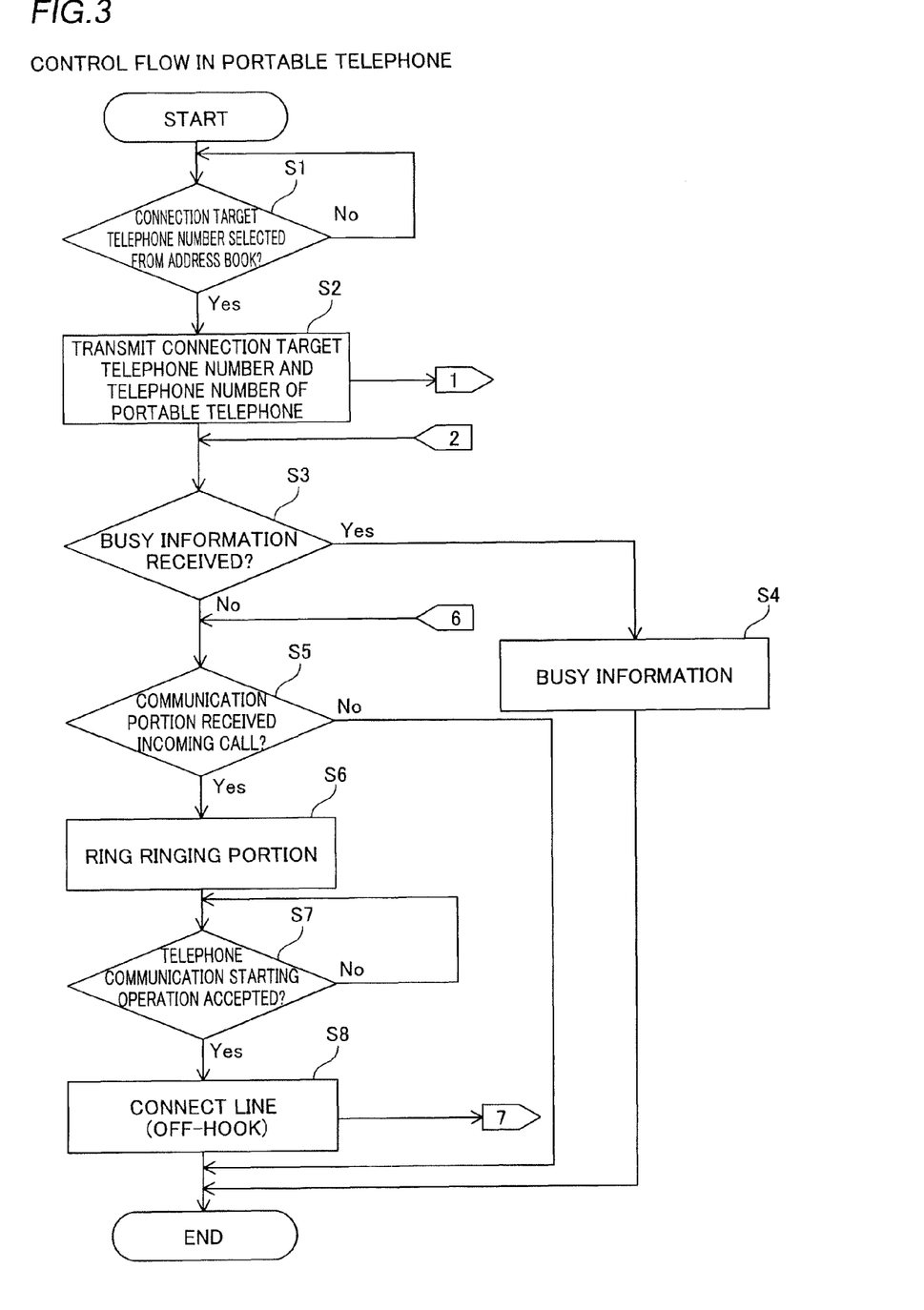
FIG. 3 is a flow chart showing processing for allowing telephone communication between a portable telephone and a connection target according to the embodiment of the present invention.

First, the CPU 26*a* (see FIG. 1) of the portable telephone 2*a* determines whether or not the user has selected any one of the plurality of connection target telephone numbers 224*a* from the address book 124*a* (see FIG. 1) at a step S1, as shown in FIG. 3. The CPU 26*a* repeats this determination until the same determines that the user has selected any one of the plurality of connection target telephone numbers 224*a* at the step S1. When determining that the user has selected any one of the plurality of connection target telephone numbers 224*a* at the step S1, the CPU 26*a* transmits the selected connection target telephone number 224*a* and the telephone number "aaa-aaaa-aaaa" of the portable telephone 2*a* to the gateway apparatus 1 through the infrared communication portion 22*a* (see FIG. 1) at a step S2. According to this embodiment, the user has selected the connection target telephone number 224*a* corresponding to the connection target 4.

Figure 4:
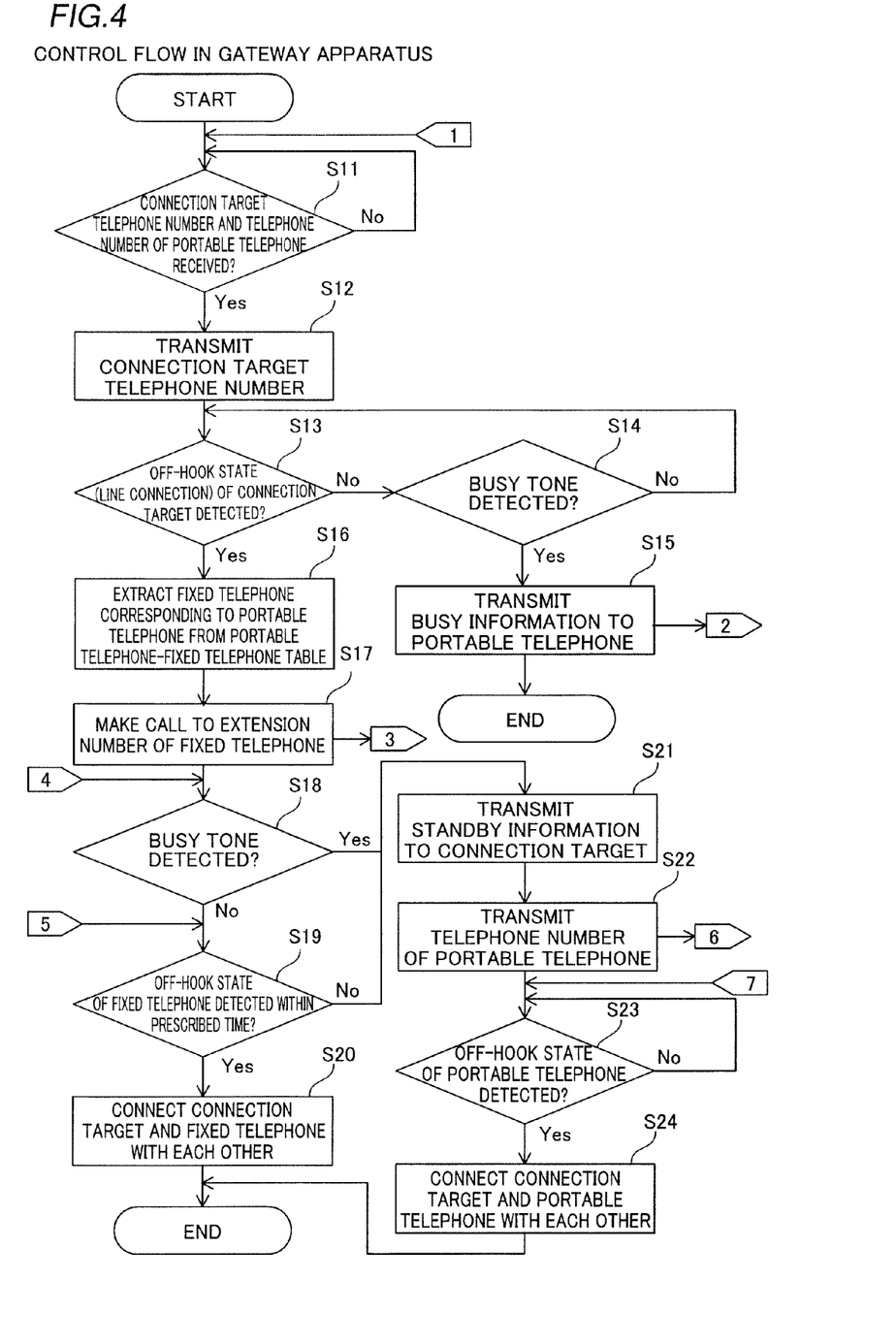
FIG. 4 is a flow chart showing processing for allowing telephone communication with a connection target in a gateway apparatus according to the embodiment of the present invention.

The CPU 16 (see FIG. 1) of the gateway apparatus 1 determines whether or not the same has received the connection target telephone number 224*a* and the telephone number of the portable telephone 2*a* having transmitted the connection target telephone number 224*a* at a step S11, as shown in FIG. 4. The CPU 16 repeats this determination until determining that the same has received the connection target telephone number 224*a* and the telephone number of the portable telephone 2*a* at the step S11. When determining that the same has received the connection target telephone number 224*a* and the telephone number of the portable telephone 2*a* at the step S11, the CPU 16 attempts connection to the connection target 4 specified by the connection target telephone number 224*a* by transmitting the connection target telephone number 224*a* to the external telephone switchboard (not shown) or the like through the analog communication portion 11 or the IP communication portion 12 (see FIG. 1) at a step S12.

At a step S13, the CPU 16 determines whether or not the same has detected that the user of the connection target 4 has picked up an unshown telephone receiver and the line has been connected (off-hook). If determining that the same has not detected off-hook of the connection target 4 at the step S13, the CPU 16 determines whether or not the same has detected the busy tone indicating that the line of the connection target 4 is busy at a step S14. When determining that the same has not detected the busy tone at the step S14, the CPU 16 returns to the step S13, to determine whether or not the same has detected off-hook of the connection target 4 again. When determining that the same has detected the busy tone at the step S14, on the other hand, the CPU 16 determines that connection with the connection target 4 cannot be established and transmits the information (busy information) to the portable telephone 2*a* with the message "the line is busy".

The CPU 26*a* of the portable telephone 2*a* determines whether or not the same has received the busy information at a step S3, as shown in FIG. 3. When determining that the same has received the busy information at the step S3, the CPU 26*a* outputs busy information with a voice or an image at a step S4. Thus, the CPU 26*a* of the portable telephone 2*a* terminates the processing. When determining that the same has not received the busy information at the step S3, on the other hand, the CPU 26*a* advances to a step S5 described later.

When the CPU 16 of the gateway apparatus 1 determines that the same has detected off-hook of the connection target 4 at the step S13 as shown in FIG. 4, connection between the connection target 4 and the gateway apparatus 1 is established. Then, the CPU 16 refers to the portable telephone-fixed telephone table 16a (see FIG. 2) and extracts the fixed telephone 3a corresponding to the portable telephone 2a having the telephone number "aaa-aaaa-aaaa" at a step S16. Then, the CPU 16 makes a call to the extension number "AAA" of the fixed telephone 3a from the analog communication portion 11 (see FIG. 1) through the extension line at a step S17. Then, the CPU 16 advances to a step S18.

Figure 5:
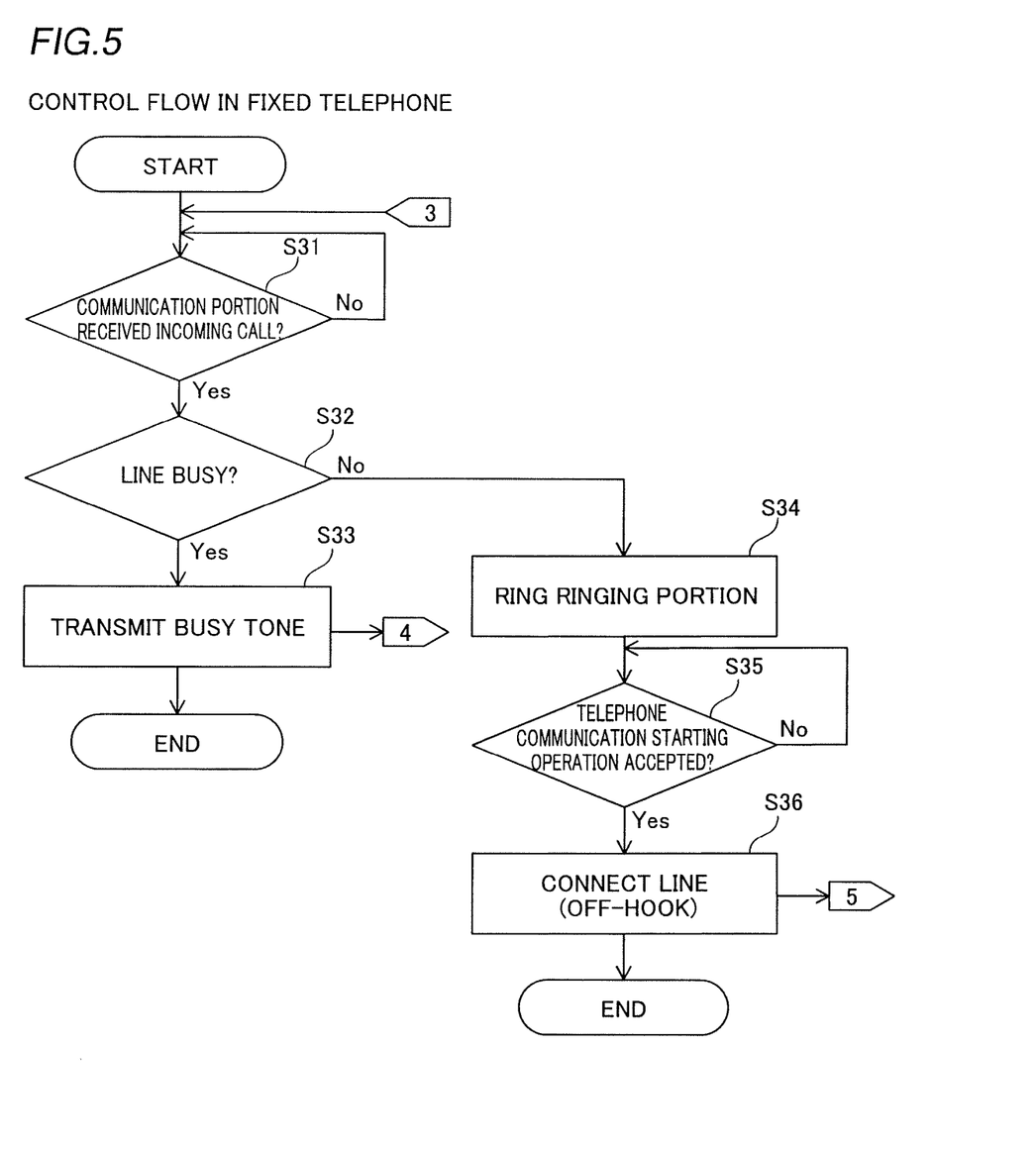
FIG. 5 is a flow chart showing processing for allowing telephone communication between a fixed telephone and a connection target according to the embodiment of the present invention.

The CPU 33a (see FIG. 1) of the fixed telephone 3a determines whether or not the communication portion 31a (see FIG. 1) has received an incoming call at a step S31, as shown in FIG. 5. The CPU 33a repeats this determination until the same determines that the communication portion 31a has received the incoming call at the step S31. When determining that the communication portion 31a has received the incoming call at the step S31, the CPU 33a determines whether or not the user of the fixed telephone 3a is already in communication with another connection target or another fixed telephone 4b, 4c or 4d at a step S32. When determining that the user is already in communication with another connection target or another fixed telephone 4b, 4c or 4d at the step S32, the CPU 33a transmits a busy tone to the gateway apparatus 1 at a step S33, thereby informing the gateway apparatus 1 that the line of the fixed telephone 3a is busy. Thus, the CPU 33a of the fixed telephone 3a terminates the processing. When determining that the user is not in communication with another connection target or another fixed telephone 4b, 4c or 4d at the step S32, on the other hand, the CPU 33a rings the ringing portion 32a at a step S34.

Then, the CPU 33a determines whether or not the same has accepted a telephone communication starting operation at a step S35. The CPU 33a repeats this determination until determining that the same has accepted the telephone communication starting operation at the step S35. When determining that the same has accepted the telephone communication starting operation at the step S35, the CPU 33a connects the line with the gateway apparatus 1 (off-hook) and informs the gateway apparatus 1 about the off-hook at a step S36. Thus, both of connection between the connection target 4 and the gateway apparatus 1 and connection between the fixed telephone 3a and the gateway apparatus 1 are established. Then, the CPU 33a of the fixed telephone 3a terminates the processing.

The CPU 16 of the gateway apparatus 1 determines whether or not the same has detected the busy tone transmitted from the fixed telephone 3a (refer to the step S33 in FIG. 5) at a step S18, as shown in FIG. 4. When determining that the same has not detected the busy tone at the step S18, the CPU 16 determines whether or not the same has determined off-hook of the fixed telephone 3a within a prescribed time at a step S19. When determining that the same has detected off-hook of the fixed telephone 3a within the prescribed time at the step S19, the CPU 16 connects the connection target 4 and the fixed telephone 3a with each other through the external telephone switchboard at a step S20, to allow telephone communication between the connection target 4 and the fixed telephone 3a. Thus, the CPU 16 of the gateway apparatus 1 terminates the processing.

When determining that the same has detected the busy tone at the step S18 or determining that the same has not detected off-hook of the fixed telephone 3a within the prescribed time at the step S19, on the other hand, the CPU 16 determines that connection with the fixed telephone 3a cannot be established and transmits the information (standby information) requesting the connection target 4 to be on standby with the message "connecting, please wait" to the connection target 4 with which the connection has been established at a step S21. Then, the CPU 16 transmits the telephone number "aaa-aaaa-aaaa" of the portable telephone 2a (having transmitted the connection target telephone number 224a) corresponding to the fixed telephone 3a with which connection cannot be established to the external portable telephone base station (not shown) or the like through the analog communication portion 11 or the IP communication portion 12, thereby connecting the gateway apparatus 1 with the portable telephone 2a at a step S22.

The CPU 26a of the portable telephone 2a determines whether or not the communication portion 21a has received an incoming call at the step S5, as shown in FIG. 3. When determining that the communication portion 21 has received no incoming call at the step S5, the CPU 26a of the portable telephone 2a terminates the processing. When determining that the communication portion 21 has received an incoming call at the step S5, on the other hand, the CPU 26a rings the ringing portion 23a at a step S6.

Then, the CPU 26a determines whether or not the same has accepted a telephone communication starting operation at a step S7. The CPU 26a repeats this determination until determining that the same has accepted the telephone communication starting operation at the step S7. When determining that the same has accepted the telephone communication starting operation at the step S7, the CPU 26a connects the line with the gateway apparatus 1 (off-hook) and informs the gateway apparatus 1 about the off-hook at a step S8. Thus, both of connection between the connection target 4 and the gateway apparatus 1 and connection between the portable telephone 2a and the gateway apparatus 1 are established. Then, the CPU 26a of the portable telephone 2a terminates the processing. The CPU 16 of the gateway apparatus 1 determines whether or not the same has detected off-hook of the portable telephone 2a at a step S23, as shown in FIG. 4.

The CPU 16 repeats this determination until determining that the same has detected off-hook of the portable telephone 2a at the step S23. When determining that the same has detected off-hook of the portable telephone 2a at the step S23, the CPU 16 connects the portable telephone 2 and the fixed telephone 3a with each other to allow telephone communication between the portable telephone 2a and the fixed telephone 3a at a step S24. Then, the CPU 16 of the gateway apparatus 1 terminates the processing.

According to this embodiment, as hereinabove described, the gateway apparatus 1 is provided with the infrared communication portion 13 capable of receiving the connection target telephone number 224a and the telephone number of the portable telephone 2a from the infrared communication portion 22a of the portable telephone 2a and the CPU 16 connecting the fixed telephone 3a to the connection target 4 specified by the connection target telephone number 224a by making a call to the connection target telephone number 224a while ringing the ringing portion 32a of the fixed telephone 3a by referring to the portable telephone-fixed telephone table 16a stored in the ROM 14 and making a call to the extension number "AAA" of the fixed telephone 3a corresponding to the portable telephone 2a. Thus, the gateway apparatus 1 can inform the user about the fixed telephone 3a connected to the connection target 4 on the basis of the connection target telephone number 224a by ringing the ringing portion 32a of the fixed telephone 3a corresponding to the portable telephone 2a from which the connection target telephone number 224a has been acquired. The CPU 16, capable of recognizing the fixed telephone 3a corresponding to the portable telephone 2a from which the connection target telephone number 224a has been acquired on the basis of the association previously stored in the ROM 14, can more reliably ring the ringing portion 32*a* of the fixed telephone 3*a* corresponding to the portable telephone 2*a* from which the connection target telephone number 224*a* has been acquired.

According to this embodiment, as hereinabove described, the infrared communication portion 13 is formed to also acquire the telephone number "aaa-aaaa-aaaa" (telephone number information) of the portable telephone 2*a* from the portable telephone 2*a*, in addition to the connection target telephone number 224*a* of the connection target 4. Thus, the infrared communication portion 13 can easily specify the fixed telephone 3*a* corresponding to the portable telephone 2*a* on the basis of the telephone number information acquired from the portable telephone 2*a*.

According to this embodiment, as hereinabove described, the CPU 16 is formed, when connection with the fixed telephone 3*a* cannot be established, to allow telephone communication between the portable telephone 2*a* and the connection target 4 by transmitting the telephone number "aaa-aaaa-aaaa" of the portable telephone 2*a* to the external portable telephone base station or the like and connecting the portable telephone 2*a* thereto. Thus, the CPU 16 can more reliably allow the user having transmitted the connection target telephone number 224*a* from the portable telephone 2*a* to make telephone communication with the connection target 4 by connecting the portable telephone 2*a* from which the connection target telephone number 224*a* has been acquired and the connection target 4 with each other through the analog communication portion 11 or the IP communication portion 12 also when the user does not make telephone communication through the fixed telephone 3*a* whose ringing portion 32*a* has been rung. Connection with the fixed telephone 3*a* cannot be established when the CPU 16 determines that the line of the fixed telephone 3*a* is busy (refer to the step S18 in FIG. 4) and when the CPU 16 determines that the user has not performed a telephone communication starting operation on the fixed telephone 3*a* within the prescribed time from starting of ringing of the ringing portion 32*a* of the fixed telephone 3*a* (refer to the step S19 in FIG. 4).

According to this embodiment, as hereinabove described, the CPU 16 is formed to transmit the information requesting the connection target 4 to be on standby with the message "connecting, please wait" to the connection target 4 with which the connection has been established through the analog communication portion 11 or the IP communication portion 12 before connecting the connection target 4 to the portable telephone 2*a* when connection with the fixed telephone 3*a* cannot be established. Thus, the CPU 16 can previously inform the connection target 4 that the same is requested to be on standby before a lapse of the time (waiting time) required for connecting the portable telephone 2*a* and the connection target 4 with each other through the analog communication portion 11 or the IP communication portion 12, whereby the connection target 4 can be inhibited from erroneously recognizing that the same has been disconnected from the gateway apparatus 1 in the waiting time.

According to this embodiment, as hereinabove described, the CPU 16 is formed to transmit the busy information to the portable telephone 2*a* with the message "the line is busy" through the infrared communication portion 13 when the line of the connection target 4 is busy and connection with the connection target 4 specified by the connection target telephone number 224*a* cannot be established. Thus, the user of the portable telephone 2*a* can easily recognize that connection with the connection target 4 is not established.

According to this embodiment, as hereinabove described, the CPU 16 is formed to select either the outside telephone network 6 or the IP network 7 not occupied for another call or the like and to make a call through the selected network 6 or 7. Thus, the user can easily make telephone communication through the outside telephone network 6 or the IP network 7 not occupied for another call or the like.

According to this embodiment, as hereinabove described, the CPU 16 is formed to select either the outside telephone network 6 or the IP network 7 at a lower charge and to make a call through the selected network 6 or 7. Thus, the user can make telephone communication at a low cost through the outside telephone network 6 or the IP network 7 at a lower charge.

Although the present invention has been described and illustrated in detail, it is clearly understood that the same is by way of illustration and example only and is not to be taken by way of limitation, the spirit and scope of the present invention being limited only by the terms of the appended claims.

For example, while the gateway apparatus 1 is employed as the example of the private branch exchange and the portable telephones 2*a* to 2*d* are employed as the examples of the portable terminal in the aforementioned embodiment, the present invention is not restricted to this. According to the present invention, the private branch exchange may be another private branch exchange such as an IP-PBX (Internet Protocol Private Branch eXchange). Further, the portable terminal may simply be formed to be capable of transmitting connection target telephone numbers, and may be another portable terminal such as a PDA (Personal Digital Assistant) having no telephone communication function, for example.

While the portable telephone 2*a* transmits the connection target telephone number 224*a* and the telephone number "aaa-aaaa-aaaa" thereof to the gateway apparatus 1 by radio communication through the infrared communication portion 13 in the aforementioned embodiment, the present invention is not restricted to this. According to the present invention, the portable telephone may alternatively transmit the connection target telephone number and the telephone number thereof to the gateway apparatus by another radio communication such as Bluetooth (registered trademark) other than the infrared communication.

While the portable telephones 2*a* to 2*d* and the gateway apparatus 1 are connected with each other to be capable of making telephone communication not only through the portable telephone network 5 but also through the outside telephone network 6 and the IP network 7, the present invention is not restricted to this. According to the present invention, the gateway apparatus may alternatively be provided with a portable telephone communication portion allowing telephone communication through the portable telephone network so that the portable telephones and the gateway apparatus can make telephone communication only through the portable telephone network. In this case, the gateway apparatus may also serve as a telephone switchboard in the portable telephone network, thereby constructing a portable telephone network which is only locally usable. Thus, the user can make telephone communication through the portable telephone network free of charge, dissimilarly to the case of making telephone communication through the external portable telephone network.

While the gateway apparatus 1 and the fixed telephones 3*a* to 3*d* are connected with each other through the extension lines in the aforementioned embodiment, the present invention is not restricted to this. According to the present invention, the gateway apparatus and the fixed telephones may alternatively be connected with each other through outside lines and the outside telephone network.

While the CPU 16 refers to the portable telephone-fixed telephone table 16*a* stored in the ROM 14 and extracts the fixed telephone 3*a* corresponding to the portable telephone 2*a* having transmitted the connection target telephone number 224*a* in the aforementioned embodiment, the present invention is not restricted to this. According to the present invention, the CPU may alternatively extract the fixed telephone corresponding to the portable telephone without employing the portable telephone-fixed telephone table. For example, the portable telephone previously stores the extension number of the corresponding fixed telephone, and is formed to transmit the stored extension number of the fixed telephone in place of the telephone number of itself. Thus, the gateway apparatus can transmit the extension number of the fixed telephone received from the portable telephone without referring to the association between the portable telephone and the fixed telephone. Further alternatively, the gateway apparatus may be formed to recognize the position of the portable telephone having transmitted the connection target telephone number with a GPS receiver or the like thereby associating a fixed telephone present on a position nearest to the portable telephone as the fixed telephone corresponding to the portable telephone.

While the CPU 16 transmits the busy information to the portable telephone 2*a* without ringing the ringing portion 32*a* of the fixed telephone 3*a* when the line of the connection target 4 is busy and connection with the connection target 4 specified by the connection target telephone number 224*a* cannot be established in the aforementioned embodiment, the present invention is not restricted to this. According to the present invention, a display portion or the like provided on the fixed telephone may display busy information when connection with the connection target cannot be established. Thus, the display portion or the like can inform the user that the line is busy also when the CPU cannot transmit the information to the portable telephone through the infrared communication portion.

While the CPU 16 of the gateway apparatus 1 is formed to extract the fixed telephone 3*a* corresponding to the portable telephone 2*a* and to make a call to the extension number of the extracted fixed telephone 3*a* while maintaining connection with the connection target 4 when connection with the connection target 4 is established in the aforementioned embodiment, the present invention is not restricted to this. According to the present invention, the gateway apparatus may alternatively be formed, when connection with the connection target is established, to temporarily cancel the connection with the connection target without maintaining the connection so that the connection target makes a call to the gateway apparatus for reconnecting the connection target and the gateway apparatus with each other (for calling back the gateway apparatus). Thus, the charge for the call for maintaining the connection with the connection target can be prevented from increase due to a long time required by the gateway apparatus for connecting the connection target and the fixed telephone (portable telephone) with each other.

What is claimed is:

1. A private branch exchange comprising:
   a first communication portion capable of acquiring connection target specifying information related to a connection target from a portable terminal whose user selects the connection target;
   a second communication portion allowing telephone communication between a fixed telephone associated with said portable terminal and said connection target on the basis of said connection target specifying information; and
   a control portion making a call to said connection target on the basis of said connection target specifying information, without connecting said portable terminal with said connection target to allow telephone communication, and ringing said fixed telephone associated with said portable terminal from which said connection target specifying information has been acquired.

2. The private branch exchange according to claim 1, further comprising a storage portion storing association between each of a plurality of said portable terminals and said fixed telephone associated with each of said plurality of portable terminals, wherein
   said control portion is formed to ring said fixed telephone associated with said portable terminal from which connection target specifying information has been acquired on the basis of said association between said portable terminal and said fixed telephone stored in said storage portion.

3. The private branch exchange according to claim 2, wherein
   said first communication portion is formed to also acquire telephone number information of said portable terminal from said portable terminal, in addition to said connection target specifying information related to said connection target.

4. The private branch exchange according to claim 2, wherein
   said storage portion stores one-to-one correspondence between said portable terminal and said fixed telephone in a list form.

5. The private branch exchange according to claim 4, wherein
   said storage portion stores one-to-one correspondence between a telephone number assigned to said portable terminal and an extension number assigned to said fixed telephone in a list form.

6. The private branch exchange according to claim 1, wherein
   said control portion is formed to allow telephone communication between said fixed telephone and said connection target by connecting said fixed telephone and said connection target with each other through said second communication portion when the user makes telephone communication through said fixed telephone in response to ringing of said fixed telephone.

7. The private branch exchange according to claim 1, wherein
   said second communication portion is formed to be connectable to said portable terminal and said connection target, and
   said control portion is formed to allow telephone communication between said portable terminal and said connection target by connecting said portable terminal associated with said fixed telephone and said connection target with each other through said second communication portion when the user does not make telephone communication through said fixed telephone in response to ringing of said fixed telephone.

8. The private branch exchange according to claim 7, wherein
   said control portion is formed to allow telephone communication between said portable terminal and said connection target by connecting said portable terminal associated with said fixed telephone and said connection target with each other through said second communication portion in place of telephone communication between said fixed telephone and said connection target on the assumption that the user does not make telephone communication through said fixed telephone in response to ringing of said fixed telephone when determining that the line of said fixed telephone is busy.

9. The private branch exchange according to claim 7, wherein
said control portion is formed to allow telephone communication between said portable terminal and said connection target by connecting said portable terminal associated with said fixed telephone and said connection target with each other through said second communication portion in place of telephone communication between said fixed telephone and said connection target on the assumption that the user does not make telephone communication through said fixed telephone in response to ringing of said fixed telephone when determining that the user has not performed a telephone communication starting operation on said fixed telephone up to a lapse of a prescribed time from starting of ringing of said fixed telephone.

10. The private branch exchange according to claim 7, wherein
said control portion is formed to transmit information requesting said connection target to be on standby to said connection target through said second communication portion before connecting said portable terminal associated with said fixed telephone and said connection target with each other through said second communication portion.

11. The private branch exchange according to claim 1, wherein
said control portion is formed to transmit information purporting that connection with said connection target is not established to said portable terminal through said first communication portion without ringing said fixed telephone when connection with said connection target is not established.

12. The private branch exchange according to claim 1, wherein
said first communication portion is formed to acquire said connection target specifying information related to said connection target from said portable terminal by making infrared communication.

13. The private branch exchange according to claim 1, wherein said second communication portion includes:
a telephone communication portion connected to an outside telephone network, and
an IP communication portion connected to an IP network, and
is formed to allow telephone communication between said fixed telephone and said connection target through at least either said outside telephone network or said IP network.

14. The private branch exchange according to claim 13, wherein
said control portion is formed to make a call by selecting either said outside telephone network or said IP network not occupied for another call.

15. The private branch exchange according to claim 13, wherein
said control portion is formed to make a call by selecting either said outside telephone network or said IP network at a lower charge.

16. A telephone system comprising:
a portable terminal capable of transmitting connection target specifying information related to a connection target, wherein a user of the portable terminal selects the connection target;
a plurality of fixed telephones; and
a private branch exchange including a first communication portion capable of acquiring said connection target specifying information transmitted from said portable terminal, a second communication portion allowing telephone communication between said fixed telephone associated with said portable terminal and said connection target on the basis of said connection target specifying information, and a control portion formed to make a call to said connection target on the basis of said connection target specifying information, without connecting said portable terminal with said connection target to allow telephone communication, and to ring said fixed telephone associated with said portable terminal from which said connection target specifying information has been acquired.

17. The telephone system according to claim 16, wherein
said private branch exchange further includes a storage portion storing association between each of a plurality of said portable terminals and said fixed telephone associated with each of said plurality of portable terminals, and
said control portion of said private branch exchange is formed to ring said fixed telephone associated with said portable terminal from which said connection target specifying information has been acquired on the basis of said association between said portable terminal and said fixed telephone stored in said storage portion.

18. The telephone system according to claim 17, wherein
said first communication portion of said private branch exchange is formed to also acquire telephone number information of said portable terminal from said portable terminal, in addition to said connection target specifying information related to said connection target.

19. The telephone system according to claim 17, wherein
said storage portion of said private branch exchange stores one-to-one correspondence between said portable terminal and said fixed telephone in a list form.

20. The telephone system according to claim 19, wherein
said storage portion of said private branch exchange stores one-to-one correspondence between a telephone number assigned to said portable terminal and an extension number assigned to said fixed telephone in a list form.

\* \* \* \* \*